(12) United States Patent
Baek et al.

(10) Patent No.: US 12,349,155 B2
(45) Date of Patent: Jul. 1, 2025

(54) METHOD AND APPARATUS FOR TRANSMITTING MULTIPLE ENTRY CONFIGURED GRANT CONFIRMATION MESSAGE IN WIRELESS COMMUNICATION SYSTEM

(71) Applicant: Samsung Electronics Co., Ltd., Suwon-si (KR)

(72) Inventors: Sangkyu Baek, Suwon-si (KR); Anil Agiwal, Suwon-si (KR); Soenghun Kim, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 373 days.

(21) Appl. No.: 17/772,022

(22) PCT Filed: Nov. 6, 2020

(86) PCT No.: PCT/KR2020/015445
§ 371 (c)(1),
(2) Date: Apr. 26, 2022

(87) PCT Pub. No.: WO2021/091276
PCT Pub. Date: May 14, 2021

(65) Prior Publication Data
US 2022/0369359 A1  Nov. 17, 2022

(30) Foreign Application Priority Data

Nov. 7, 2019  (KR) ......................... 10-2019-0141755

(51) Int. Cl.
*H04B 3/10*  (2006.01)
*H04W 72/23*  (2023.01)
*H04W 80/02*  (2009.01)

(52) U.S. Cl.
CPC ............ *H04W 72/23* (2023.01); *H04W 80/02* (2013.01)

(58) Field of Classification Search
CPC . H04W 72/23; H04W 80/02; H04W 72/1268; H04W 72/20
See application file for complete search history.

(56) References Cited

U.S. PATENT DOCUMENTS

2019/0132862 A1  5/2019  Jeon et al.
2019/0207737 A1*  7/2019  Babaei ................ H04L 27/2607
(Continued)

FOREIGN PATENT DOCUMENTS

KR  10-2021-0004782 A  1/2021

OTHER PUBLICATIONS

Ericsson (R2-1906840, May 13-17, 2019, Confirmation MAC CE design) (Year: 2019).*
(Continued)

*Primary Examiner* — Maharishi V Khirodhar
(74) *Attorney, Agent, or Firm* — Jefferson IP Law, LLP

(57) ABSTRACT

Disclosed are: a communication technique for merging, with IoT technology, a 5G communication system for supporting a data transmission rate higher than that of a 4G system; and a system therefor. The present disclosure can be applied to intelligent services (for example, smart homes, smart buildings, smart cities, smart cars or connected cars, healthcare, digital education, small businesses, security- and safety-related services, and the like) on the basis of 5G communication technology and IoT-related technology. The present invention relates to a method and an apparatus for transmitting a confirmation message for a plurality of configured grants in a wireless communication system.

15 Claims, 10 Drawing Sheets

(56) References Cited

U.S. PATENT DOCUMENTS

2019/0289638 A1\* 9/2019 Kung ................ H04W 74/0833
2022/0086891 A1 3/2022 Baek et al.

OTHER PUBLICATIONS

CMCC (R2-1904355, Apr. 8-12, 2019, outstanding issues for multiple SPSs-CGs Support) (Year: 2019).\*
Huawei (R2-1907261, Discussion on configured grant confirmation MAC-CE, May 13-17, 2019) (Year: 2019).\*
LG (R2-1913143, Confirmation MAC CE for multiple CG configurations, Oct. 14-18, 2019). (Year: 2019).\*
Samsung, UL configured grants for eURLLC, R1-1910488, 3GPP TSG RAN WG1 #98bis, Chongqing, China, Oct. 8, 2019.
Vivo, Enhanced UL configured grant transmissions for URLLC, R1-1910226, 3GPP TSG RAN WG1 #98bis, Chongqing, China, Oct. 4, 2019.
Nokia et al., On support of UL transmission with configured grants in NR-U, R1-1910595, 3GPP TSG RAN WG1 #98bis, Chongqing, China, Oct. 7, 2019.
CATT, Discussion on enhanced UL configured grant transmission, R1-1910346, 3GPP TSG RAN WG1 #98bis, Chongqing, China, Oct. 5, 2019.
Korean Office Action with English translation dated Mar. 30, 2025; Korean Appln. No. 10-2019-0141755.

\* cited by examiner

METHOD AND APPARATUS FOR TRANSMITTING MULTIPLE ENTRY CONFIGURED GRANT CONFIRMATION MESSAGE IN WIRELESS COMMUNICATION SYSTEM

TECHNICAL FIELD

The disclosure relates to a method and an apparatus for transmitting a confirmation message for a plurality of configured grants in a wireless communication system.

BACKGROUND ART

To meet the increasing demand for wireless data traffic since the deployment of 4G communication systems, efforts have been made to develop an improved 5G or pre-5G communication system. Therefore, the 5G or pre-5G communication system is also called a "beyond 4G network" communication system or a "post LTE System". Implementation of the 5G communication system in ultrahigh frequency (mmWave) bands, e.g., 60 GHz bands, is being considered in order to accomplish higher data transmission rates. To mitigate a path loss of the radio waves and increase the transmission distance on the radio waves in the ultrahigh frequency bands, beamforming, massive multiple-input multiple-output (massive MIMO), full dimensional MIMO (FD-MIMO), array antenna, analog beamforming, and large scale antenna techniques are being discussed for 5G communication systems. In addition, in 5G communication systems, development for system network improvement is under way based on evolved small cells, advanced small cells, cloud radio access networks (cloud RANs), ultra-dense networks, device-to-device (D2D) communication, wireless backhaul, moving network, cooperative communication, coordinated multi-points (CoMP), reception-end interference cancellation, and the like. In addition, in the 5G system, hybrid FSK and QAM modulation (FQAM) and sliding window superposition coding (SWSC), as advanced coding modulation (ACM) systems, and filter bank multi carrier (FBMC), non-orthogonal multiple access (NOMA), and sparse code multiple access (SCMA), as advanced access technologies, have been developed.

On the other hand, the Internet, which is a human centered connectivity network where humans generate and consume information, is now evolving to the Internet of things (IoT) network where distributed entities, such as things, exchange and process information. The Internet of everything (IoE) technology, which is a combination of IoT technology and big data processing technology through connection with a cloud server, has emerged. Technology elements, such as "sensing technology", "wired/wireless communication and network infrastructure", "service interface technology", and "security technology" have been demanded for IoT implementation; therefore, technologies, such as a sensor network, machine-to-machine (M2M) communication, machine type communication (MTC) for a connection between things, are recently researched. Such an IoT environment may provide intelligent Internet technology (IT) services that create a new value for human life by collecting and analyzing data generated among connected things. IoT may be applied to fields including smart home, smart building, smart city, smart car or connected car, smart grid, health care, smart appliances, and advanced medical services through convergence and combination between existing information technology (IT) and various industrial applications.

In line with this, various attempts have been made to apply 5G communication systems to IoT networks. For example, technologies such as a sensor network, machine-to-machine (M2M) communication, and machine type communication (MTC) may be implemented by techniques of beamforming, MIMO, and array antennas, which correspond to the 5G communication technology. Application of a cloud radio access network (cloud RAN) as the above-described big data processing technology may also be considered to be an example of convergence between the 5G technology and the IoT technology.

In a wireless communication system, a base station may allocate a resource through determination of what radio resource a UE uses for sending. For example, the base station may perform configured scheduling for notifying the UE of a commonly used configuration including a period of a resource that can be used by the UE, and the radio resource allocated in a configured scheduling method may be referred to as a configured grant (CG). A plurality of configured grants (CGs) can also be configured in the same UE, in the same cell, or in the same bandwidth part (BWP).

Meanwhile, the UE may notify the base station whether a second type configured grant is activated or deactivated by transmitting a configured grant confirmation message to the base station during activation or deactivation of the corresponding configured grant.

DISCLOSURE OF INVENTION

Technical Problem

If a large number of second type configured grants are configured in a UE in a state where a plurality of configured grants are configured as above, a configured grant confirmation message is required to include information on what configured grant is activated or deactivated.

Accordingly, one aspect of the disclosure is to provide a method and an apparatus for reporting triggering of a plurality of configured grant confirmation messages to a base station in case that the plurality of configured grant confirmation messages for reporting activated/deactivated states of a plurality of configured grants are triggered.

Solution to Problem

According to an embodiment of the disclosure to solve the above problems, a method performed by a terminal in a wireless communication system may include: receiving, from a base station, information on configurations of a plurality of configured grants (CGs); identifying whether a confirmation for at least one CG of the plurality of CGs has been triggered; identifying whether there is an uplink resource allocated for a transmission of a message for the confirmation in case that the confirmation has been triggered and not cancelled; generating a message including information indicating whether each of the plurality of CGs is activated in case that there is the uplink resource; and transmitting, to the base station, the message based on the uplink resource.

Further, according to an embodiment of the disclosure, a method performed by a base station in a wireless communication system may include: transmitting, to a terminal, information on configurations of a plurality of configured grants (CGs); transmitting, to the terminal, a signaling to trigger a confirmation for at least one CG of the plurality of CGs; allocating an uplink resource for a new transmission of a message for the confirmation; and receiving, from the terminal, the message including information indicating whether each of the plurality of CGs is activated based on the uplink resource.

Further, according to an embodiment of the disclosure, a terminal in a wireless communication system may include: a transceiver; and a controller configured to: control the transceiver to receive, from a base station, information on configurations of a plurality of configured grants (CGs), identify whether a confirmation for at least one CG of the plurality of CGs has been triggered, identify whether there is an uplink resource allocated for a transmission of a message for the confirmation in case that the confirmation has been triggered and not cancelled, generate a message including information indicating whether each of the plurality of CGs is activated in case that there is the uplink resource, and control the transceiver to transmit, to the base station, the message based on the uplink resource.

Further, according to an embodiment of the disclosure, a base station in a wireless communication system may include: a transceiver; and a controller configured to: control the transceiver to transmit, to a terminal, information on configurations of a plurality of configured grants (CGs), control the transceiver to transmit, to the terminal, a signaling to trigger a confirmation for at least one CG of the plurality of CGs, allocate an uplink resource for a new transmission of a message for the confirmation, and control transceiver to receive, from the terminal, the message including information indicating whether each of the plurality of CGs is activated based on the uplink resource.

Advantageous Effects of Invention

According to an embodiment of the disclosure, in a situation that the plurality of configured grant confirmation messages have been triggered, the configured grant confirmation message can be efficiently transmitted to the base station.

MODE FOR THE INVENTION

Figure 1:
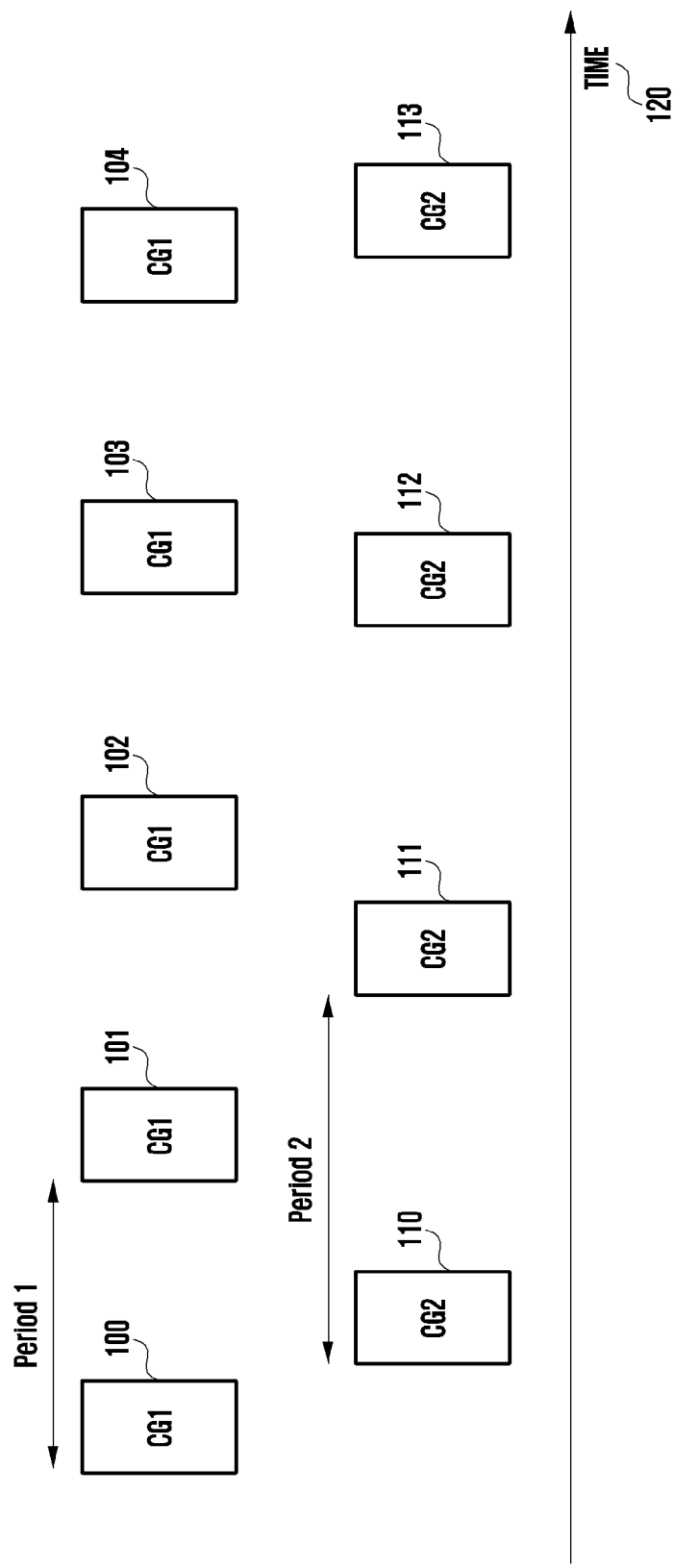
FIG. 1 is a diagram explaining an operation method of configured grant.

Hereinafter, embodiments of the disclosure will be described in detail with reference to the accompanying drawings. In describing the disclosure, detailed explanation of related well-known functions or configurations incorporated herein will be omitted in the case where it is determined that they obscure the subject matter of the disclosure in unnecessary detail. Further, terms to be described later are terms defined in consideration of their functions in the disclosure, but they may differ depending on intentions of a user and an operator or customs. Accordingly, they should be defined based on the contents of the whole description of the disclosure.

The advantages and features of the disclosure and methods for achieving the advantages and features will be apparent by referring to the embodiments to be described in detail with reference to the accompanying drawings. However, the disclosure is not limited to the embodiments disclosed hereinafter, and it can be implemented in diverse forms. The present embodiments are provided only to complete the description of the disclosure and to completely inform those of ordinary skill in the art of the category of the disclosure, and the disclosure is only defined within the scope of the appended claims. In the entire description of the disclosure, the same drawing reference numerals are used for the same elements across various figures.

In describing the disclosure hereinafter, detailed explanation of related known functions or configurations will be omitted if it is determined that it obscures the gist of the disclosure unnecessarily. Hereinafter, embodiments of the disclosure will be described with reference to the accompanying drawings.

FIG. 1 is a diagram explaining an operation method of configured grant.

In a wireless communication system, a base station may use a resource allocation method through determination of what radio resource a UE uses for sending. As such a resource allocation method, there are dynamic scheduling for allocating a resource to be used for each slot, subslot, frame, and subframe, which are basic units to use resources on a time axis, and configured scheduling for notifying of a commonly used configuration including a period of an available resource. A radio resource allocated in a configured scheduling method may be referred to as a configured grant (CG), and the configured grant may be configured through transmission of a radio resource control (RRC) message which a base station transmits to a UE.

As information that may be configured through the RRC message, there may be frequency hopping configuration, demodulation reference signal (DMRS) configuration, modulation and coding scheme (MCS) table to be used, resource allocation type, whether to use a power control loop, repetition or not, periodicity, configured grant timer value, antenna port, MCS index, frequency hopping offset, time domain offset, time domain allocation, and the like. Further, the corresponding information may be included in a configured grant config in the RRC message.

An embodiment of FIG. 1 shows a situation in which two configured grants, i.e., first configured grant (CG1) 100, 101, 102, 103, and 104 and second configured grant (CG2) 110, 111, 112, and 113, are configured. In this manner, a plurality of configured grants can be configured in the same UE, in the same cell, or in the same bandwidth part (BWP). Each of the configured grants may have periods 150 and 160 configured on a time axis 120 by the RRC message and the like, and configured grant resources may be repeated according to the periods.

The configured grant has a first type configured grant and a second type configured grant according to the characteristic thereof. The first type configured grant means a configured grant of which all configuration values are transferred through the RRC message, so that there is not any other control of the base station. The first type configured grant is a configured grant which does not have a separate activation or deactivation procedure, and thus once configured, is applied until the configuration is released.

The second type configured grant may mean the configured grant of which some configurations, such as the periods, are transferred through the RRC message, and after the configuration, it may be actually activated through transferring of the activation message by the base station. The activation message may be transferred in the form of downlink control information (DCI) of the physical downlink control channel (PDCCH).

The UE having received the activation message for the second type configured grant may transfer a configured grant confirmation message notifying the base station that the corresponding configured grant has been activated. The configured grant confirmation message may have a control element (CE) form of a medium access control (MAC) layer. Further, the base station may transfer a deactivation message for deactivating the second type configured grant.

The UE having received the deactivation message for the second type configured grant may transfer a configured grant confirmation message notifying the base station that the configured grant has been deactivated. If completion of the deactivation of the UE is notified through the configured grant confirmation message, the UE may clear the corresponding configured grant.

Figure 2:
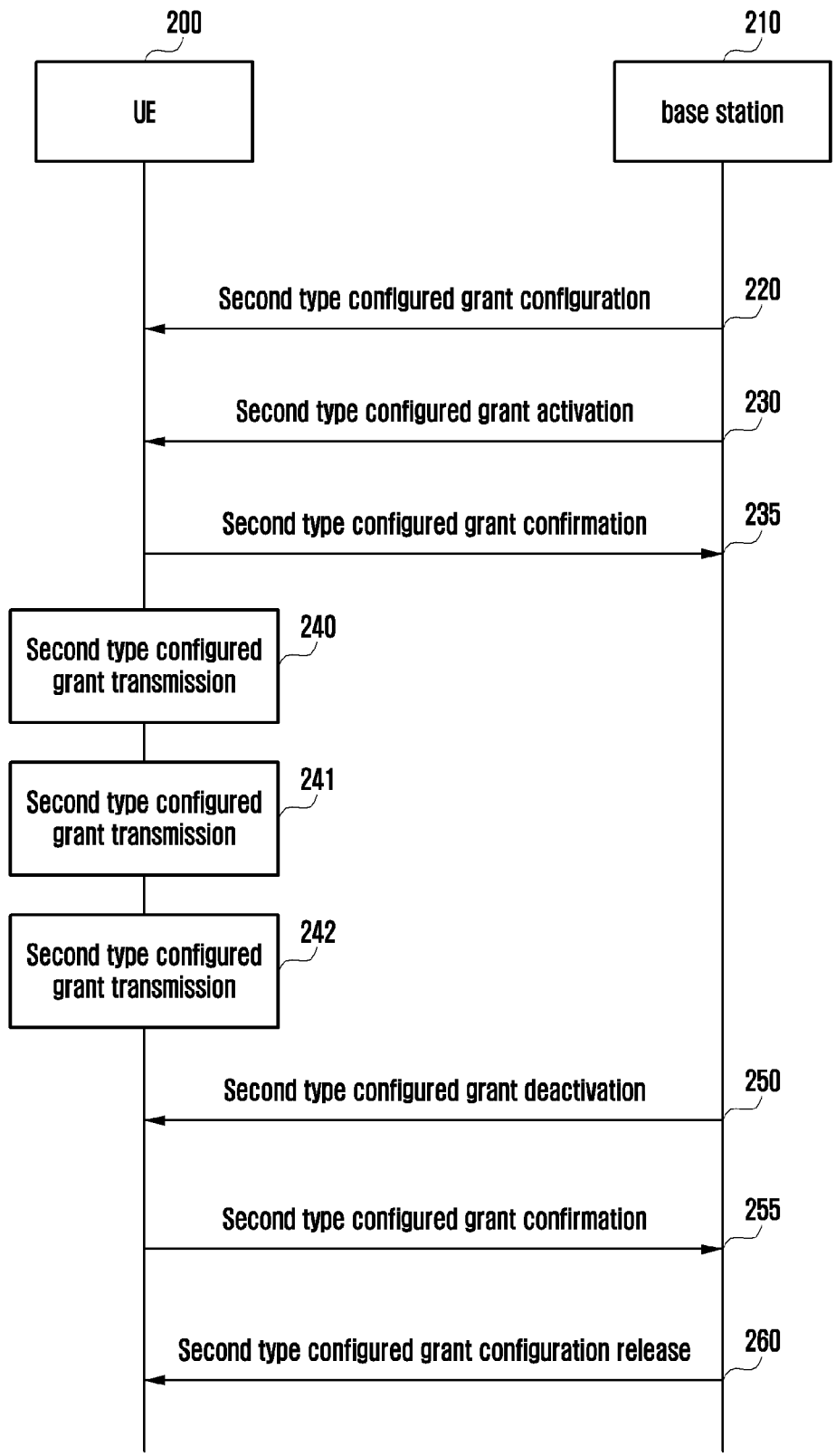
FIG. 2 is a diagram illustrating a procedure in which a second type configured grant is configured and activated.

FIG. 2 is a diagram illustrating a procedure in which a second type configured grant is configured and activated.

A UE 200 may receive an RRC message by a base station 210, and this message may include configuration information of a second type configured grant (220). An embodiment of FIG. 2 shows that a second type configured grant is configured to the corresponding UE 200. Since the second type configured grant has an activation procedure, only some pieces of configuration information required for resource usage may be included in the configuration message 220. As information included herein, there may be frequency hopping configuration to be used for the second type configured grant, demodulation reference signal (DMRS) configuration, modulation and coding scheme (MCS) table to be used, resource allocation type, whether to use a power control loop, repetition or not, periodicity, configured grant timer value, and the like. In addition, a configured grant index that is an identifier for identifying the configured second type configured grant may be included.

The first type configured grant and the second type configure grant may use the configured grant index together. The configured grant index may be uniquely configured in the cell group, uniquely configured in the cell, or uniquely configured in the BWP. Such information may be included in the configured grant config in the RRC message.

Meanwhile, even if the second type configured grant has been configured (220), the corresponding resource is not actually allocated until activation instructions of the base station are made. After the second type configured grant is configured (220), the base station 210 may activate the second type configured grant by transmitting a second type configured grant activation message to the UE 200 (230). As information that may be included in the activation message, there may be antenna port to be used for the second type configured grant, MCS index, frequency hopping offset, time domain offset, time domain allocation, and the like.

After activating the second type configured grant for which the activation instructions have been received, the UE 200 may notify the base station 210 of completion of the activation by transmitting a second type configured grant confirmation message to the base station 210 (235). Such a configured grant confirmation message may be triggered after the activation instructions are received, and thereafter, may be transmitted when an uplink resource is allocated.

Further, after the activation, the UE 200 may transmit data using a designated radio resource at a designated time (240, 241, and 242). In FIG. 2, it is assumed that the resource of the second type configured grant can be periodically transmitted three times, and this means that one resource is allocated for each configured period. If data to be transmitted is not present in the configured grant allocated to the UE 200, a skipping operation may be performed, in which the corresponding configured grant is not used and the transmission is not performed.

When the transmission using the second type configured grant is not necessary, the base station 210 may instruct the UE 200 to deactivate the second type configured grant (250), and the UE 200 may notify the base station 210 of the completion of the instructed deactivation by transmitting the second type configured grant confirmation message to the base station 210 (255), and may deactivate the corresponding second type configured grant. The configured grant confirmation message may be triggered after the reception of the deactivation instructions, and thereafter, may be transmitted when the uplink resource is allocated. Further, the base station 210 may release the configured second type configured grant by sending a second type configured grant release message 260 to the UE at a time when it is determined that the second type configured grant configuration is not necessary any more.

Figure 3:
FIG. 3 is a diagram illustrating an example of a confirmation message type of a second type configured grant proposed in the disclosure.

FIG. 3 is a diagram illustrating an example of a confirmation message type of a second type configured grant proposed in the disclosure.

As described with reference to FIG. 2, when the second type configured grant is activated or deactivated, the UE should notify the base station whether the corresponding configured grant has been activated or deactivated by transmitting the configured grant confirmation message to the base station. If there are a large number of second type configured grants configured to the UE, the configured grant confirmation message is required to include information on what configured grant has been activated or deactivated. In an embodiment of FIG. 3, the configured grant confirmation message having the medium access control (MAC) control element (CE) form is assumed, but there are no restrictions on the detailed form of the message.

If an upper limit of the number of second type configured grants configurable to the UE has been determined, the MAC CE presented in FIG. 3 may be a MAC CE of a fixed length. In an embodiment of FIG. 3, it is indicated that up to 32 second type configured grants have been configured. Although it is assumed that the configured grant confirmation message 300 according to an embodiment of FIG. 3 has a Gi field (i=0, 1, . . . , 31) representing a bit representing the activation state of the configured grant as configured above, the number of Gi fields and indexes indicated by the respective fields may differ.

The Gi field is a field representing activation or deactivation of the i-th configured grant with one-bit indicator. For example, if the Gi field has the value of 1, it may represent that the corresponding configured grant has been activated, whereas if the Gi field has the value of 0, it may represent that the corresponding configured grant has been deactivated.

In another embodiment, the Gi field may be used as a bit for notifying that the configuration of the base station has been applied with respect to the second type configured grant of which the activation or deactivation is indicated by the base station. In this case, the Gi field having the value of 1 may be a confirmation notifying that the activation or deactivation instructed by the base station has been applied with respect to the corresponding second type configured grant, and the Gi field having the value of 0 may be a confirmation for not notifying of the activation or deactivation instructed by the base station with respect to the corresponding second type configure grant.

In this case, a method for configuring the i-th configured grant may be one of the following methods.

- The configured grant having the configured grant index value of i may become the i-th configured grant (configured grant in which the Gi field represents the activation or deactivation state). In this case, if the i-th configured grant is the second type configured grant, the activation or deactivation state of the configure grant may be reported to the base station by the Gi field. If the i-th configured grant is the first type configured grant, it may not be necessary to report the activation or deactivation state of the configured grant. Accordingly, in case of the Gi field corresponding to the first type configured grant, the value of 1 may be configured if the corresponding configured grant has been configured, whereas the value of 0 may be configured if the corresponding configured grant has not been configured. In another embodiment, in case of the Gi field corresponding to the first type configured grant, the preconfigured value of 0 or 1 may be configured. Further, the UE may include a certain value so as to make the base station disregard the corresponding field. In addition, if the i-th configured grant has not been configured (if the configured grant represented by the Gi field has not been configured), the corresponding field may be configured as the preconfigured value of 0 or 1. Further, the UE may include a certain value so as to make the base station disregard the corresponding field.

- The configured second type configured grant may become the i-th configured grant (configured grant in which the Gi field represents the activation or the deactivation) in the ascending order (or descending order) of the configured grant index. In this case, the Gi field corresponding to the first type configured grant is not present. If the i-th configured grant is not configured (if the configured grant represented by the Gi field is not configured), the corresponding field may be configured as the preconfigured value of 0 or 1. Further, the UE may include a certain value so as to make the base station disregard the corresponding field.

- The second type configured grant configured to a cell to which the configured grant confirmation message is transmitted may become the i-th configured grant (configured grant in which the Gi field represents the activation or the deactivation) in the ascending order (or descending order) of the configured grant index. In this case, the Gi field corresponding to the first type configured grant is not present. If the i-th configured grant is not configured (if the configured grant represented by the Gi field is not configured), the corresponding field may be configured as the preconfigured value of 0 or 1. Further, the UE may include a certain value so as to make the base station disregard the corresponding field. The confirmation message for the configured second type configured grant may be transmitted only in the cell in which the corresponding second type configured grant is configured.

- The second type configured grant configured to a bandwidth part (BWP) to which the configured grant confirmation message is transmitted may become the i-th configured grant (configured grant in which the Gi field represents the activation or the deactivation) in the ascending order (or descending order) of the configured grant index. In this case, the Gi field corresponding to the first type configured grant is not present. If the i-th configured grant is not configured (if the configured grant represented by the Gi field is not configured), the corresponding field may be configured as the preconfigured value of 0 or 1. Further, the UE may include a certain value so as to make the base station disregard the corresponding field. The confirmation message for the configured second type configured grant may be transmitted only in the BWP in which the corresponding second type configured grant is configured.

- The configured grant having the configured grant index value of i may become the i-th configured grant (configured grant in which the Gi field represents the activation or deactivation state). In this case, if the i-th configured grant is the second type configured grant, the activation or deactivation state of the configure grant may be reported to the base station by the Gi field. If the i-th configured grant is the first type configured grant, it may not be necessary to report the activation or deactivation state of the configured grant. Accordingly, in case of the Gi field corresponding to the first type configured grant, the value of 1 may be configured if the corresponding configured grant has been configured, whereas the value of 0 may be configured if the corresponding configured grant has not been configured. In another embodiment, in case of the Gi field corresponding to the first type configured grant, the preconfigured value of 0 or 1 may be configured. Further, the UE may include a certain value so as to make the base station disregard the corresponding field. In addition, if the i-th configured grant has not been configured (if the configured grant represented by the Gi field has not been configured), the corresponding field may be configured as the preconfigured value of 0 or 1. Further, the UE may include a certain value so as to make the base station disregard the corresponding field.

In a certain embodiment, the index for the second type configured grant may be separately configured. If the index for the second type configured grant is called CGindex2, The Gi field may represent the activation or the deactivation of the second type configured grant having the CGindex2 as the value of i. In this case, the Gi field corresponding to the first type configured grant is not present. If the i-th configured grant is not configured (if the configured grant represented by the Gi field is not configured), the corresponding field may be configured as the preconfigured value of 0 or 1. Further, the UE may include a certain value so as to make the base station disregard the corresponding field.

- The second type configured grant configured to a cell to which the configured grant confirmation message is transmitted may become the i-th configured grant (configured grant in which the Gi field represents the activation or the deactivation) in the ascending order (or descending order) of the second type configured grant index (i.e., CGindex2). In this case, the Gi field corresponding to the first type configured grant is not present. If the i-th configured grant is not configured (if the configured grant represented by the Gi field is not configured), the corresponding field may be configured as the preconfigured value of 0 or 1. Further, the UE may include a certain value so as to make the base station disregard the corresponding field. The confirmation message for the configured second type configured grant may be transmitted only in the cell in which the corresponding second type configured grant is configured.

The second type configured grant configured to a bandwidth part (BWP) to which the configured grant confirmation message is transmitted may become the i-th configured grant (configured grant in which the Gi field represents the activation or the deactivation) in the ascending order (or descending order) of the second type configured grant index (i.e., CGindex2). In this case, the Gi field corresponding to the first type configured grant is not present. If the i-th configured grant is not configured (if the configured grant represented by the Gi field is not configured), the corresponding field may be configured as the preconfigured value of 0 or 1. Further, the UE may include a certain value so as to make the base station disregard the corresponding field. The confirmation message for the configured second type configured grant may be transmitted only in the BWP in which the corresponding second type configured grant is configured.

Figure 4:
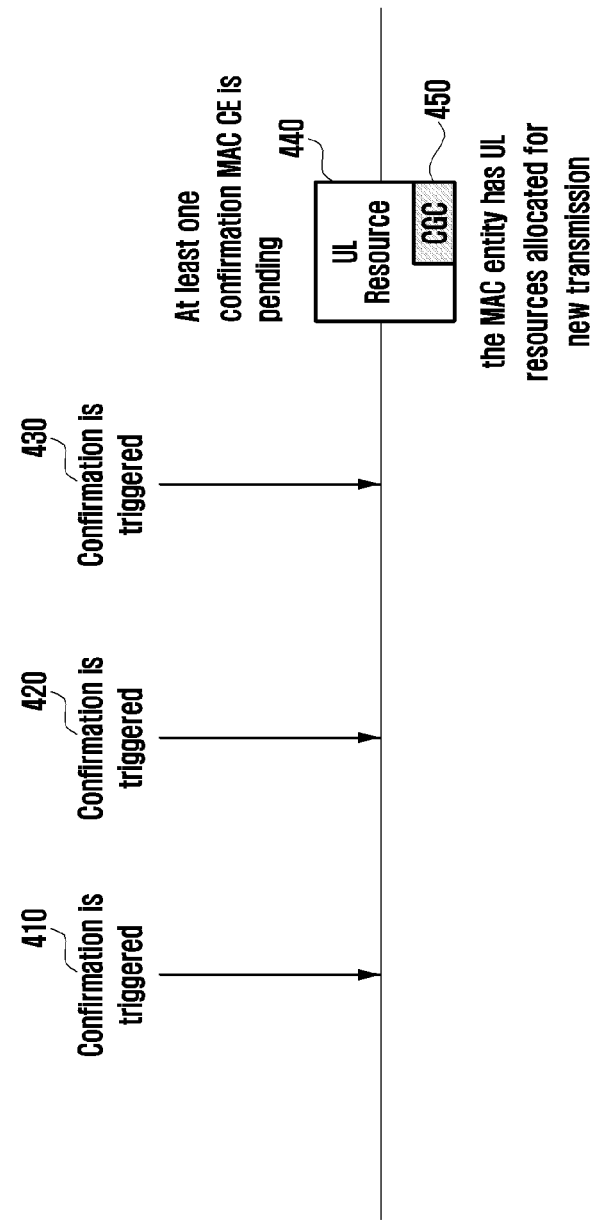
FIG. 4 is a diagram illustrating a method in which a configured grant confirmation message proposed in the disclosure is transmitted.

FIG. 4 is a diagram illustrating a method in which a configured grant confirmation message proposed in the disclosure is transmitted.

As represented in the example of FIG. 3, in case that a configured grant confirmation message having a bitmap form of a Gi field is used, activation/deactivation states of a plurality of configured grants may be reported through the configured grant confirmation message. Accordingly, even in case that a plurality of configured grant confirmation messages have been triggered, it is not necessary to transmit the configured grant confirmation message for each triggering. Accordingly, if at least one configured grant confirmation message has been triggered with respect to a MAC device, and the MAC device has a non-canceled configured grant confirmation message, a multiplexing and assembly device may be instructed to generate the configured grant confirmation message when an uplink radio resource for new transmission is allocated. The configured grant confirmation message generated at this time may be a message of latest information in which the latest activation/deactivation state at a time when the message is transmitted is reflected.

In an embodiment of FIG. 4, it is assumed that three configured grant confirmation messages are triggered (410, 420, and 430), and they are not canceled. Thereafter, the MAC device of the UE is allocated with an uplink resource 440 for new transmission. In this case, it is not necessary to transmit the configured grant confirmation message as many as the number of triggers. That is, only one configured grant confirmation message 450 may be generated and transmitted through reflection of activation/deactivation information of the configured grant in the configured grant confirmation message triggered at this time.

After the configured grant confirmation message is sent, all triggered configured grant confirmation message may be canceled. In a certain embodiment, the configured grant confirmation message being canceled at this time may be limited to the triggering of the configured grant of which the activation/deactivation state is reported in the configured grant confirmation message.

In a certain embodiment, the configured grant confirmation message may be made to send only configured grant activation/deactivation state information for a single cell or a single BWP. For example, the Gi field described with reference to FIG. 3 may be defined to report only the activation/deactivation state of the configured grant for a specific cell or BWP, or the configured grant confirmation message may include a BWP ID or a cell ID to report the activation/deactivation state of the configured grant for the specific cell or the specific BWP.

In this case, the operation of the embodiment of FIG. 4 may be applied only to the specific cell or BWP. For example, the configured grant confirmation messages triggered at operations 410 and 420 may be confirmation messages for the configured grant in the same BWP, and the configured grant confirmation message triggered at operation 430 may be for the configured grant in another BWP. In this case, if the configured grant confirmation message sent at operation 450 is information on the configured grant confirmation message triggered at operations 410 and 420, that is, the configured grant confirmation message defined in the BWP, only the configured grant confirmation messages triggered at operations 410 and 420 may be canceled.

Figure 5:
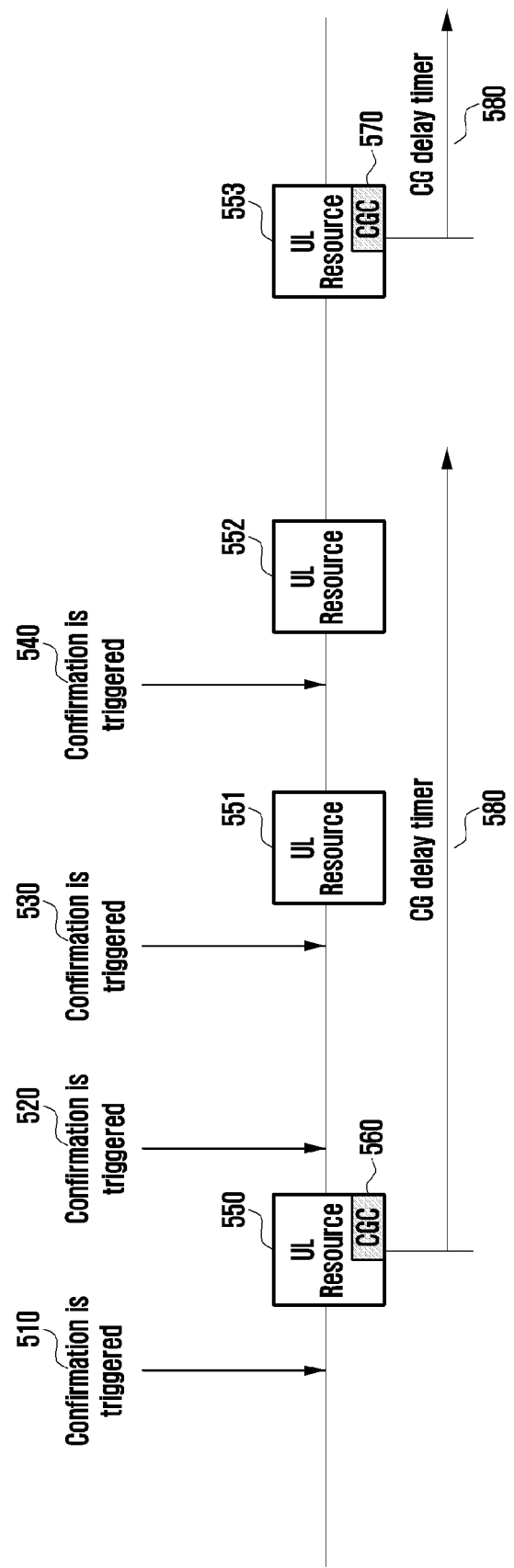
FIG. 5 is a diagram illustrating a method in which a configured grant confirmation message proposed in the disclosure is transmitted.

FIG. 5 is a diagram illustrating a method in which a configured grant confirmation message proposed in the disclosure is transmitted.

As represented in the example of FIG. 3, in case that a configured grant confirmation message having a bitmap form of a Gi field is used, activation/deactivation states of a plurality of configured grants may be reported through the configured grant confirmation message. Accordingly, even in case that a plurality of configured grant confirmation messages have been triggered, it is not necessary to transmit the configured grant confirmation message for each triggering. Accordingly, if at least one configured grant confirmation message has been triggered with respect to a MAC device, and the MAC device has a non-canceled configured grant confirmation message, a multiplexing and assembly device may be instructed to generate the configured grant confirmation message when an uplink radio resource for new transmission is allocated. The configured grant confirmation message generated at this time may be a single message of latest information in which the latest activation/deactivation state at a time when the message is transmitted is reflected.

In addition, if each of the configured grant confirmation messages has a different triggering time, but is triggered at a similar time, only one message may be sent. For this, a CG delay timer 580 may be introduced.

If the configured grant confirmation message is triggered (510), it can be confirmed whether a CG delay timer operates. If an uplink radio resource for new transmission is allocated in a state where the configured grant confirmation message is triggered and the CG delay timer does not operate, the multiplexing and assembly device may be instructed to generate the configured grant confirmation message. The configured grant confirmation message generated at this time may be a message of latest information in which the latest activation/deactivation state at the time when the message is transmitted is reflected. The generated configured grant confirmation message may be included in the allocated uplink resource, and may be transmitted (560). Then, the CG delay timer may start (580).

Thereafter, the triggered configured grant confirmation messages 520, 530, and 540 are unable to be transmitted while the CG delay timer operates. Accordingly, even if the uplink resource is allocated (551 and 552), the configured grant confirmation message is unable to be included and transmitted. Thereafter, if the uplink resource is allocated after the CG delay timer expires (553), the multiplexing and assembly device may be instructed to generate the configured grant confirmation message. In this case, the generated configured grant confirmation message may be the message of the latest information in which the latest activation/deactivation state at the time when the message is transmitted is reflected. That is, even if the number of the triggered configured grant confirmation messages is 2 or more, only one configured grant confirmation message can be transmitted (570). Further, all configured grant confirmation messages having been triggered may be canceled, and the CG delay time may restart. The base station may preconfigure the length of the CG delay timer through the RRC message.

In a certain embodiment, the configured grant confirmation message may be made to send only the configured grant activation/deactivation state information for the single cell or the single BWP. For example, the Gi field described with reference to FIG. 3 may be defined to report only the activation/deactivation state of the configured grant for the specific cell or BWP, or the configured grant confirmation message may include the BWP ID or the cell ID to report the activation/deactivation state of the configured grant for the specific cell or the specific BWP. In this case, the operation of the embodiment of FIG. 5 may be applied only to the specific cell or BWP. Further, the CG delay timer may be provided in the unit of the BWP or cell, and the operations of the CG delay timers may be independent for each BWP or cell.

Figure 6:
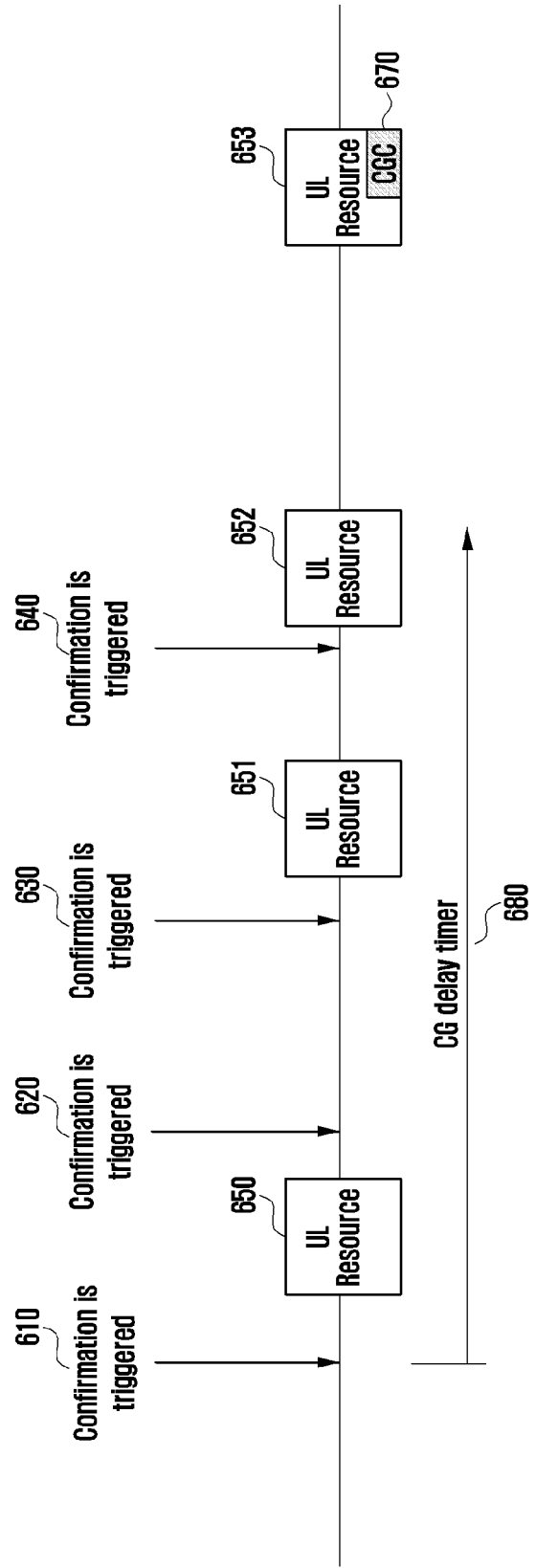
FIG. 6 is a diagram illustrating a method in which a configured grant confirmation message proposed in the disclosure is transmitted.

FIG. 6 is a diagram illustrating a method in which a configured grant confirmation message proposed in the disclosure is transmitted.

As represented in the example of FIG. 3, in case that a configured grant confirmation message having a bitmap form of a Gi field is used, activation/deactivation states of a plurality of configured grants may be reported through the configured grant confirmation message. Accordingly, even in case that a plurality of configured grant confirmation messages have been triggered, it is not necessary to transmit the configured grant confirmation message for each triggering. Accordingly, if at least one configured grant confirmation message has been triggered with respect to a MAC device, and the MAC device has a non-canceled configured grant confirmation message, a multiplexing and assembly device may be instructed to generate the configured grant confirmation message when an uplink radio resource for new transmission is allocated. The configured grant confirmation message generated at this time may be a message of latest information in which the latest activation/deactivation state at a time when the message is transmitted is reflected.

In addition, if each of the configured grant confirmation messages has a different triggering time, but is triggered at a similar time, only one message may be sent. For this, a CG delay timer 680 may be introduced.

If the configured grant confirmation message is triggered (610), it can be confirmed whether a CG delay timer operates. If the configured grant confirmation message is triggered, and the CG delay timer does not operate, the CG delay timer may start without generating the configured grant confirmation message (680). Thereafter, the triggered configured grant confirmation messages 620, 630, and 640 are unable to be transmitted while the CG delay timer operates. Accordingly, even if the uplink resource is allocated (651 and 652), the configured grant confirmation message is unable to be included and transmitted.

Thereafter, if the uplink resource is allocated after the CG delay timer expires (653), the multiplexing and assembly device may be instructed to generate the configured grant confirmation message. In this case, the generated configured grant confirmation message may be the message of the latest information in which the latest activation/deactivation state at the time when the message is transmitted is reflected. That is, even if the number of the triggered configured grant confirmation messages is 2 or more, only one configured grant confirmation message can be transmitted (670). Further, all configured grant confirmation messages having been triggered may be canceled, and the CG delay time may restart. The base station may preconfigure the length of the CG delay timer through the RRC message.

In a certain embodiment, the configured grant confirmation message may be made to send only the configured grant activation/deactivation state information for the single cell or the single BWP. For example, the Gi field described with reference to FIG. 3 may be defined to report only the activation/deactivation state of the configured grant for the specific cell or BWP, or the configured grant confirmation message may include the BWP ID or the cell ID to report the activation/deactivation state of the configured grant for the specific cell or the specific BWP. In this case, the operation of the embodiment of FIG. 5 may be applied only to the specific cell or BWP. Further, the CG delay timer may be provided in the unit of the BWP or cell, and the operations of the CG delay timers may be independent for each BWP or cell.

Figure 7:
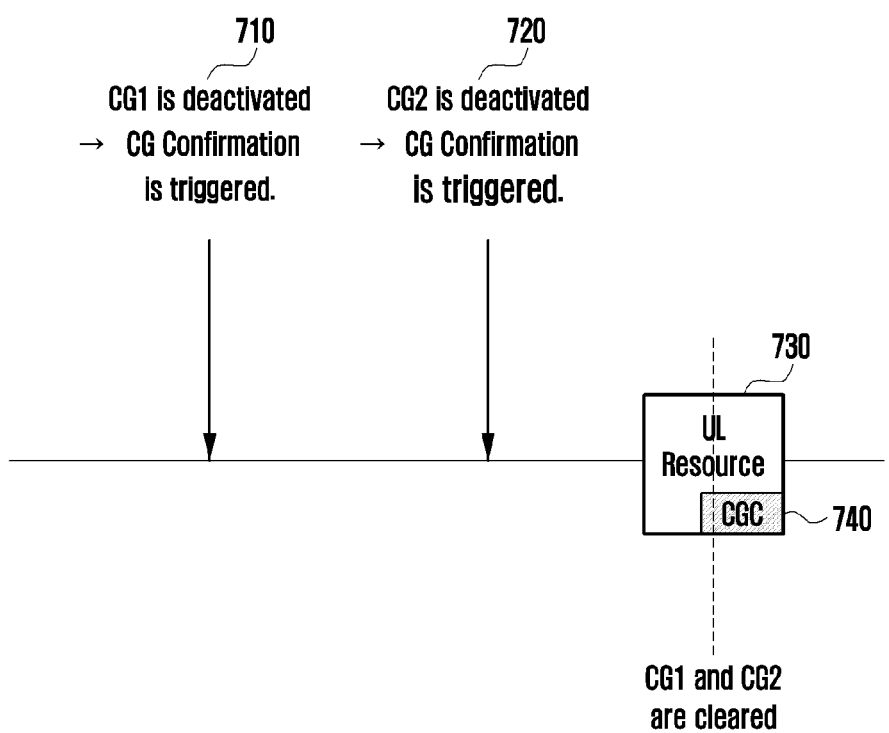
FIG. 7 is a diagram explaining an operation of deleting a second type configured grant.

FIG. 7 is a diagram explaining an operation of deleting a second type configured grant.

The deactivation of the configured grant may be instructed by the base station. According to an embodiment, one or more second type configured grant deactivations may be configured in one deactivation message. Even in case that the second type configured grant is deactivated, the configured grant confirmation message may be triggered. Further, after first transmitting the configured grant confirmation message representing the deactivation of the corresponding configured grant, the UE may clear the second type configured grant. Here, the term "clear" means that the configured grant is not used before the activation of the second type configured grant.

In an embodiment of FIG. 7, it is assumed that the deactivation is instructed with respect to configured grant 1 and configured grant 2 (710 and 720), and respective configured grant confirmation messages are triggered. Thereafter, if the uplink resource is allocated (730), the MAC device may instruct the multiplexing and assembly device to generate the configured grant confirmation message since their confirmation messages are not canceled. In this case, the generated configured grant confirmation message may be the message of the latest information in which the latest activation/deactivation state at the time when the message is transmitted is reflected. That is, even if the number of the triggered configured grant confirmation messages is 2 or more, only one configured grant confirmation message can be transmitted (740). Since the deactivation state of the configured grant 1 and the configured grant 2 has been reported through the configured grant confirmation message at operation 740, the configured grant 1 and the configured grant 2 may be cleared. The embodiment of FIG. 7 may be applied simultaneously with the method for transmitting the configured grant confirmation message proposed in FIGS. 4, 5, and 6 and the CG delay timer operation.

Figure 8:
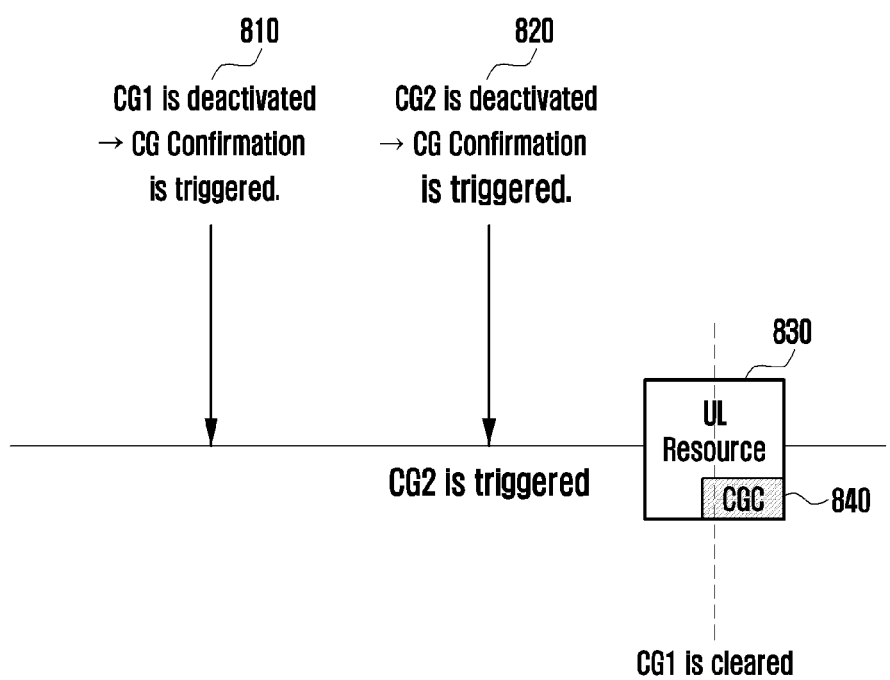
FIG. 8 is a diagram explaining an operation of deleting a second type configured grant.

FIG. 8 is a diagram explaining an operation of deleting a second type configured grant.

The deactivation of the configured grant may be instructed by the base station. According to an embodiment, one or more second type configured grant deactivations may be configured in one deactivation message. Even in case that the second type configured grant is deactivated, the configured grant confirmation message may be triggered. Further, after first transmitting the configured grant confirmation message representing the deactivation of the corresponding configured grant, the UE may clear the second type configured grant. Here, the term "clear" means that the configured grant is not used before the activation of the second type configured grant. However, if it is known that the configured grant confirmation message is to be transmitted thereafter, the configured grant may be cleared just after the deactivation of the second type configured grant is instructed.

The deactivation of the configured grant may be indicated by DCI being transmitted by the PDCCH resource. In an embodiment of FIG. 8, it is featured that some second type configured grants are cleared after the configured grant confirmation message is transmitted, and some second type configured grant is cleared just after the deactivation of the configured grant is instructed. In the embodiment of FIG. 8, it is assumed that configured grant 1 and configure grant 2 are instructed to be deactivated (810 and 820), and the respective configure grant confirmation messages are triggered.

Due to absence of other configured grant confirmation messages having been triggered, when the configured grant 1, of which the deactivation is first instructed, is allocated with the uplink resource thereafter, the confirmation message has not been canceled, and thus the MAC device may instruct the multiplexing and assembly device to generate the configured grant confirmation message. The configured grant confirmation message generated at this time may be the message of the latest information in which the latest activation/deactivation state at the time when the message is transmitted is reflected. That is, even if the number of the triggered configured grant confirmation messages is 2 or more, only one configured grant confirmation message can be transmitted (840).

Further, since the deactivation state of the configured grant 1 and the configure grant 2 has been reported through the configured grant confirmation message at operation 840, the configured grant 1 may be cleared. The configured grant 2, of which the deactivation is instructed later, may be immediately cleared since other configured grant confirmation messages having been triggered are present. The embodiment of FIG. 8 may be applied simultaneously with the method for transmitting the configured grant confirmation message proposed in FIGS. 4, 5, and 6 and the CG delay timer operation.

Figure 9:
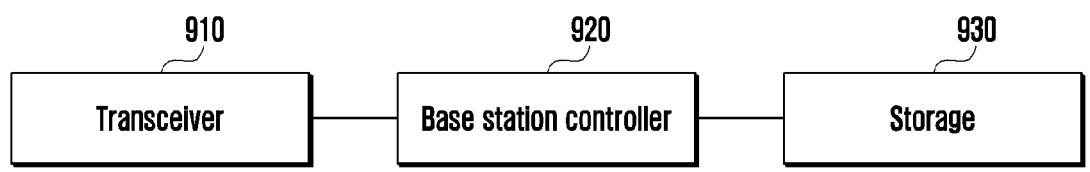
FIG. 9 is a diagram illustrating the structure of a base station according to an embodiment of the disclosure.

FIG. 9 is a diagram illustrating the structure of a base station according to an embodiment of the disclosure.

Referring to FIG. 9, a base station may include a transceiver 910, a controller 920, and a storage 930. In the disclosure, the controller 920 may be defined as a circuit, an application-specific integrated circuit, or at least one processor.

The transceiver 910 may transmit and receive signals to and from another network entity. For example, the transceiver 910 may transmit system information to a UE, and may transmit a sync signal or a reference signal. Further, according to an embodiment of the disclosure, the transceiver 910 may transmit a message for configuring the configured grant to the UE.

The controller 920 may control the overall operation of the base station according to an embodiment proposed in the disclosure. For example, the controller 920 may control a signal flow between respective blocks to perform an operation according to the above-described flowchart.

The storage 930 may store at least one of information being transmitted and received through the transceiver 910 and information being generated through the controller 920.

Figure 10:
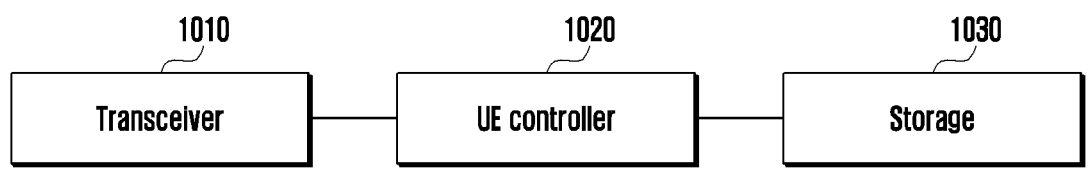
FIG. 10 is a diagram illustrating the structure of a UE according to an embodiment of the disclosure.

FIG. 10 is a diagram illustrating the structure of a UE according to an embodiment of the disclosure.

With reference to FIG. 10, a UE may include a transceiver 1010, a controller 1020, and a storage 1030. In the disclosure, the controller may be defined as a circuit, an application-specific integrated circuit, or at least one processor.

The transceiver 1010 may transmit and receive signals to and from another network entity. For example, the transceiver 1010 may receive system information from the base station, and may receive a sync signal or a reference signal. Further, according to an embodiment of the disclosure, the transceiver 1010 may receive a message for configuring the configured grant from the base station.

The controller 1020 may control the overall operation of the UE according to an embodiment proposed in the disclosure. For example, the controller 1020 may control a signal flow between respective blocks to perform an operation according to the above-described flowchart.

The storage 1030 may store at least one of information being transmitted and received through the transceiver 1010 and information being generated through the controller 1020.

It should be understood to those of ordinary skill in the art to which the disclosure pertains that the disclosure can be embodied in other detailed forms without changing the technical subject matter or essential features of the disclosure. Accordingly, the embodiments as described above should be understood as exemplary but not limited in all aspects. Accordingly, the scope of the disclosure should not be limited to the above-described embodiments, but should be defined by not only the claims but equivalents thereof, and it should be interpreted that all changes or modifications being derived from the meanings and the scope of the claims and their equivalent concept are included in the scope of the disclosure.

Although preferred embodiments of the disclosure have been described in the specification and drawings and specific wordings have been used, these are merely used as general meanings to assist those of ordinary skill in the art to gain a comprehensive understanding of the disclosure, and do not limit the scope of the disclosure. It will be apparent to those of ordinary skill in the art to which the disclosure pertains that various modifications are possible on the basis of the technical concept of the disclosure.

The invention claimed is:

1. A method performed by a terminal in a wireless communication system, the method comprising:
   receiving, from a base station, a radio resource control (RRC) message including configuration information for configuring a plurality of configured grants (CGs), the configuration information including a CG index for each of the plurality of CGs, wherein a maximum number of CGs configured for a serving cell group is 32, and wherein the CG index is configured based on an integer from 0 to 31;

identifying whether a confirmation of at least one CG has been triggered;

in case that the confirmation has been triggered and not cancelled, identifying whether there is an uplink resource allocated for a new transmission;

in case that there is the allocated uplink resource, generating a confirmation medium access control (MAC) control element (CE) having a fixed size of 32 bits, wherein one bit among the 32 bits of the confirmation MAC CE is associated with an activation or a deactivation of a configured grant and the one bit corresponds to a CG index configured for the serving cell group; and transmitting, to the base station, the confirmation MAC CE.

2. The method of claim 1, wherein identifying whether the confirmation for the at least one CG has been triggered comprises identifying whether a physical downlink control channel (PDCCH) indicating an activation or a deactivation of the at least one CG has been received, and wherein a bit value of 1 indicates that the activation or the deactivation is applied for a corresponding CG.

3. The method of claim 2, further comprising:

clearing the at least one CG based on a transmission of the confirmation MAC CE, in case that the confirmation MAC CE confirms the deactivation of the at least one CG.

4. The method of claim 1, further comprising:

canceling the triggered confirmation, in case that the confirmation MAC CE is transmitted.

5. A method performed by a base station in a wireless communication system, the method comprising:

transmitting, to a terminal, a radio resource control (RRC) message including configuration information for configuring a plurality of configured grants (CGs), the configuration information including a CG index for each of the plurality of CGs, wherein a maximum number of CGs configured in a serving cell group is 32, and wherein the CG index is configured based on an integer from 0 to 31;

transmitting, to the terminal, a physical downlink control channel (PDCCH) to trigger a confirmation of at least one CG;

allocating an uplink resource for a new transmission; and receiving, from the terminal, a confirmation medium access control (MAC) control element (CE) having a fixed size of 32 bits, wherein one bit among the 32 bits of the confirmation MAC CE is associated with an activation or a deactivation of a configured grant and the one bit corresponds to a CG index configured in the serving cell group.

6. The method of claim 5, wherein the PDCCH indicates an activation or a deactivation of the at least one CG, and wherein a bit value of 1 indicates that the activation or the deactivation is applied for a corresponding CG.

7. The method of claim 6, wherein the at least one CG is cleared in the terminal based on a transmission of the confirmation MAC CE, in case that the confirmation MAC CE confirms the deactivation of the at least one CG.

8. The method of claim 5, wherein the triggered confirmation is canceled in the terminal based on a transmission of the confirmation MAC CE.

9. A terminal in a wireless communication system, the terminal comprising:

a transceiver; and a controller configured to:

control the transceiver to receive, from a base station, a radio resource control (RRC) message including configuration information for configuring a plurality of configured grants (CGs), the configuration information including a CG index for each of the plurality of CGs, wherein a maximum number of CGs configured in a serving cell group is 32, and wherein the CG index is configured based on an integer from 0 to 31, identify whether a confirmation of at least one CG has been triggered, in case that the confirmation has been triggered and not cancelled, identify whether there is an uplink resource allocated for a new transmission, in case that there is the allocated uplink resource, generate a confirmation medium access control (MAC) control element (CE) having a fixed size of 32 bits, wherein one bit among the 32 bits of the confirmation MAC CE is associated with an activation or a deactivation of a configured grant and the one bit corresponds to a CG index configured for the serving cell group, and control the transceiver to transmit, to the base station, the confirmation MAC CE.

10. The terminal of claim 9, wherein the controller is further configured to identify whether the confirmation for the at least one CG has been triggered comprises identifying whether a physical downlink control channel (PDCCH) indicating an activation or a deactivation of the at least one CG has been received, and wherein a bit value of 1 indicates that the activation or the deactivation is applied for a corresponding CG.

11. The terminal of claim 10, wherein the controller is further configured to clear the at least one CG based on a transmission of the confirmation MAC CE, in case that the confirmation MAC CE confirms the deactivation of the at least one CG.

12. The terminal of claim 9, wherein the controller is further configured to cancel the triggered confirmation, in case that the confirmation MAC CE is transmitted.

13. A base station in a wireless communication system, the base station comprising:

a transceiver; and a controller configured to:

control the transceiver to transmit, to a terminal, a radio resource control (RRC) message including configuration information for configuring a plurality of configured grants (CGs), the configuration information including a CG index for each of the plurality of CGs, wherein a maximum number of CGs configured in a serving cell group is 32, and wherein the CG index is configured based on an integer from 0 to 31, control the transceiver to transmit, to the terminal, a physical downlink control channel (PDCCH) to trigger a confirmation of at least one CG, allocate an uplink resource for a new transmission, and control the transceiver to receive, from the terminal, a confirmation medium access control (MAC) control element (CE) having a fixed size of 32 bits, wherein one bit among the 32 bits of the confirmation MAC CE is associated with an activation or a deactivation of a configured grant and the one bit corresponds to a CG index configured in the serving cell group.

14. The base station of claim 13,
wherein the PDCCH indicates an activation or a deactivation of the at least one CG,
wherein a bit value of 1 indicates that the activation or the deactivation is applied for a corresponding CG, and
wherein the at least one CG is cleared in the terminal based on a transmission of the confirmation MAC CE, in case that the confirmation MAC CE confirms the deactivation of the at least one CG.

15. The base station of claim 13, wherein the triggered confirmation is canceled in the terminal based on a transmission of the confirmation MAC CE.

* * * * *